United States Patent
Ge et al.

(10) Patent No.: US 9,503,599 B2
(45) Date of Patent: Nov. 22, 2016

(54) APPARATUS, SYSTEM AND METHOD FOR MANAGING BACKGROUND PROCESSING ON AN IMAGE PROCESSING DEVICE

(71) Applicants: Canon Information and Imaging Solutions, Inc., Melville, NY (US); Canon U.S.A, Inc., Melville, NY (US)

(72) Inventors: Jiuyuan Ge, Centereach, NY (US); Nigel Patrick Brady, Irvine, CA (US); Song Cang, Jerricho, NY (US); Konstantin Uroskin, Brooklyn, NY (US); Kosuke Nakashima, Great Neck, NY (US); Lance Leung, Forest Hills, NY (US)

(73) Assignees: Canon Information and Imaging Solutions, Inc., Melville, NY (US); Canon U.S.A., Inc., Melville, NY (US)

( * ) Notice: Subject to any disclaimer, the term of this patent is extended or adjusted under 35 U.S.C. 154(b) by 0 days.

(21) Appl. No.: 14/680,690

(22) Filed: Apr. 7, 2015

(65) Prior Publication Data
US 2015/0288840 A1    Oct. 8, 2015

Related U.S. Application Data

(60) Provisional application No. 62/065,189, filed on Oct. 17, 2014, provisional application No. 61/977,076, filed on Apr. 8, 2014.

(51) Int. Cl.
*G06K 15/00* (2006.01)
*H04N 1/00* (2006.01)

(52) U.S. Cl.
CPC ...... *H04N 1/00856* (2013.01); *H04N 1/00875* (2013.01)

(58) Field of Classification Search
None
See application file for complete search history.

(56) References Cited

U.S. PATENT DOCUMENTS 7,239,409 B2    7/2007   Parry
7,864,354 B2    1/2011   Shahindoust et al.
(Continued)

OTHER PUBLICATIONS

Epson, "Checking Printer and Print Job Status," 2001.
(Continued)

*Primary Examiner* — Marivelisse Santiago Cordero
*Assistant Examiner* — Neil R McLean
(74) *Attorney, Agent, or Firm* — Canon USA. Inc., IP Division

(57) ABSTRACT

A system and method are provided including one or more processors and one or more computer-readable media coupled to the one or more processors. The one or more computer-readable media storing instructions that, when executed by the one or more processors, cause the one or more processors to perform operation including performing, at an image processing device, a login process wherein access to one or more resources on the image processing device is granted based on a credential associated with a user and receiving a request to perform a scan and send process is received at the image processing device, the request comprising instructions for scanning a physical document and sending an electronic document representing the scanned physical document to a destination system. The scan process is initiated and a data object including data representing job data and the credential associated with the use is generated. The send process using the generated data object is executed as a background process on the image processing device and a subsequent user is able to access the image processing device and use at least one resource of the image processing device simultaneously.

19 Claims, 5 Drawing Sheets

(56) References Cited

U.S. PATENT DOCUMENTS

| | | | |
|---|---|---|---|
| 8,054,494 B2 | 11/2011 | Takahashi et al. | |
| 8,065,406 B2 | 11/2011 | Kishimoto | |
| 8,264,711 B2 | 9/2012 | Takahashi | |
| 8,264,724 B2 * | 9/2012 | Matsuzawa | H04N 1/00222 358/1.15 |
| 8,493,604 B2 | 7/2013 | Hayami | |
| 8,693,032 B2 | 4/2014 | Goddard et al. | |
| 8,824,003 B2 | 9/2014 | Gaertner et al. | |
| 2006/0129746 A1 * | 6/2006 | Porter | G06F 9/4443 711/100 |
| 2007/0285701 A1 | 12/2007 | Ohta et al. | |
| 2011/0194146 A1 * | 8/2011 | Sato | G06F 3/1212 358/1.15 |
| 2012/0092708 A1 * | 4/2012 | Hayami | G06F 3/1204 358/1.15 |
| 2012/0200880 A1 * | 8/2012 | Uchikawa | H04N 1/00915 358/1.14 |
| 2013/0325809 A1 * | 12/2013 | Kim | G06F 11/1451 707/640 |

OTHER PUBLICATIONS

Seagull, "Using Drivers by Seagull to Display Printer Status Information," Jun. 19, 2014.

* cited by examiner

APPARATUS, SYSTEM AND METHOD FOR MANAGING BACKGROUND PROCESSING ON AN IMAGE PROCESSING DEVICE

CROSS-REFERENCE TO RELATED APPLICATIONS

This application claims the benefit of U.S. Provisional Application Nos. 61/977,076, filed Apr. 8, 2014 and 62/065,189, filed on Oct. 17, 2014, both of which are hereby incorporated by reference herein in its entirety.

BACKGROUND OF THE INVENTION

Field of the Invention

The present invention relates generally to managing information about a process, and more particularly to managing processes executed on an image processing device.

Description of the Related Art

Image processing devices are routinely deployed for both personal and commercial uses. Image processing devices may provide functionality for making photocopies, printing a document, scanning a document and generating an electronic document representing the scanned document, transmitting data over a network, accessing a database on a remote server, or other tasks. These devices are generally provided and shared among many different users in an office environment. In some instances, the image processing devices may require a user to be authenticated via unique access credential associated in order to make use of one or more resources (e.g. applications or other functionality) available on the image processing device. Moreover, certain destination systems that are accessible by the image processing device (or an application executing thereon) may also require the user to be authenticated.

Conventionally, in order for a user to be authenticated, the user may provide a access credentials. The authentication may be based on a username and password, a smart card, a personal identification number (PIN), biometric information, other information associated with the user, or a combination of two or more of these. Once logged in to the image processing device, the user has access to one or more resources of the image processing device.

For example, a multifunction peripheral, copier, scanner, printer, or other image processing device, may require users to be authenticated before granting them access to one or more resources of the image processing device. Additionally or alternatively, an application executing on the image processing device may require users to be authenticated before granting them access to one or more resources of the application or image processing device. Once logged in to the image processing device and/or application, the user may be permitted to utilize various functions, features, and user interfaces in order to perform particular tasks. By way of example, the image processing device and/or application executing on the image processing device may provide functionality for making photocopies, printing a document, scanning a document and generating an electronic document representing the scanned document, transmitting data over a network, accessing a database on a remote server, or other task. When logged out of the image processing device and/or application, the user may have no access or limited access to functionality and information of the image processing device and/or application.

A drawback associated with conventional login processes described above occurs in an environment when the image processing device is being shared amongst a plurality of users. Typically, once the user is authenticated with the image processing device and executes one or more tasks on the image processing device, the image processing device is unusable by any other users who share the image processing device. Thus, for a task involving a large scan job followed by a send job where the scanned data is communicated to a destination system, it would be desirable to allow other users to make use of image processing device resources prior to the completion of one or more previously executed tasks. However, a drawback exists when one or more previous executed tasks requires the proper authentication credentials for completion. A system and method according to invention principles remedies the drawbacks described above.

BRIEF SUMMARY OF THE INVENTION

Methods, systems, and computer-readable media for managing processes executed on an image processing device are disclosed.

Some embodiments of the invention include performing, at an image processing device, a login process wherein access to one or more resources on the image processing device is granted based on a credential associated with a user. A request to perform a scan and send process is received at the image processing device, the request comprising instructions for scanning a physical document and sending an electronic document representing the scanned physical document to a destination. The scan process is initiated. A data object is generated and stored in a processing queue in a memory, the data object includes data representing (a) the credential associated with the user and required by the destination system; (b) the electronic document and (c) an address associated with the destination. The send process executes as a background process enabling subsequent users to log into the device, wherein the send process uses the stored credential to access the destination system at the address and transmits the electronic document to the destination system.

In one embodiment, a method is provided and comprises the activities of performing, at an image processing device, a login process wherein access to one or more resources on the image processing device is granted based on a credential associated with a user and receiving a request to perform a scan and send process is received at the image processing device, the request comprising instructions for scanning a physical document and sending an electronic document representing the scanned physical document to a destination system. The method further includes initiating the scan process and generating a data object including data representing job data and the credential associated with the user. The send process using the generated data object is executed as a background process on the image processing device and a subsequent user is simultaneously able to access the image processing device and use at least one resource of the image processing device.

In another embodiment, a system including one or more processors and one or more computer-readable media coupled to the one or more processors is provided. The one or more computer-readable media storing instructions that, when executed by the one or more processors, cause the one or more processors to perform operation including performing, at an image processing device, a login process wherein access to one or more resources on the image processing device is granted based on a credential associated with a user and receiving a request to perform a scan and send process is received at the image processing device, the request comprising instructions for scanning a physical document and sending an electronic document representing the scanned physical document to a destination system. The scan process is initiated and a data object including data representing job data and the credential associated with the use is generated. The send process using the generated data object is executed as a background process on the image processing device and a subsequent user is able to access the image processing device and use at least one resource of the image processing device simultaneously Further features of the present invention will become apparent from the following description of exemplary embodiments with reference to the attached drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE INVENTION

Figure 1:
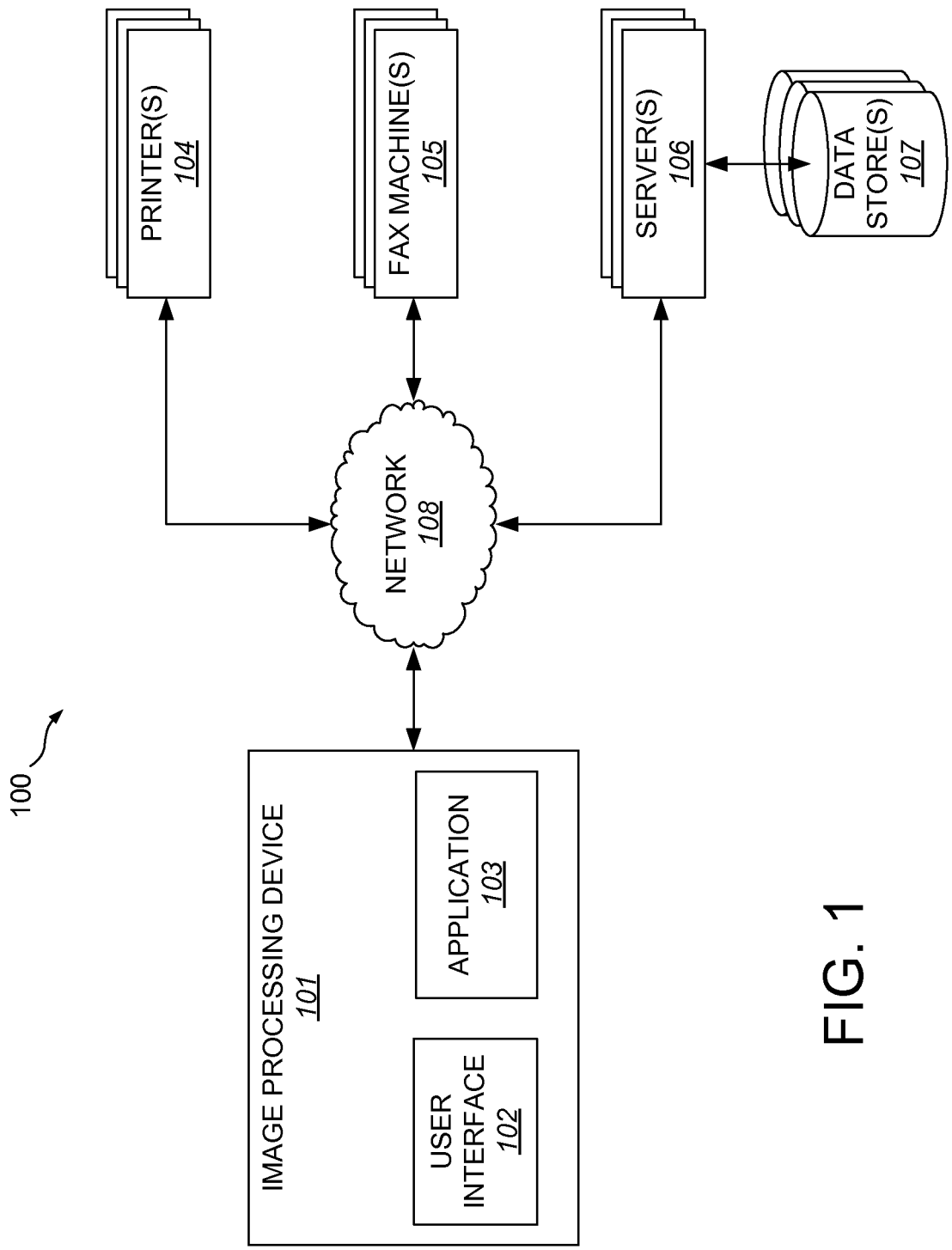
FIG. 1 illustrates an example network environment.

The image processing device according to invention principles advantageously enables a plurality of users to more efficiently use the resources of the image processing device while linking respective user-entered authentication credentials with respective tasks thereby allowing a task created by a first user to continue while enabling a second different user to request access to a resource for the purpose of initiating a second task. By linking user-entered credentials, the image processing device advantageously allows for an in-progress task that requires authentication for completion thereof, to be completed by storing, in a data object, user credential data along with job data. For example, a device task may be a scan and send task that includes two distinct sub-tasks: the scan sub-task and the send sub-task. During the scan phase, job data is entered into a send queue which is executed during the send phase. The job data includes electronic document data representative of a scanned physical document and/or address data identifying a destination system to which the electronic document is to be sent. Also stored in the send queue are user credential data that is required for accessing the destination system at the stored address. In one embodiment, the credentials may be input by a user when accessing the image processing device (or a particular application executing on the image processing device). In other embodiments, an application may request from a user, entry of destination specific user credentials one of before, during or after execution of the scan phase. The image processing device (or an application executing on the image processing device) can store these credentials for later use during the send phase. This improves the operation of the device because, as these credentials are per user, the device no longer needs to initiate access to other resources or destinations systems before a second user can access and use the device. By storing user credential data with job data, the security associated with the job is maintained while allowing other users to initiate tasks thereby improving workplace efficiency. Additionally, the storing of destination-specific user credentials for later use enables the machine to improve its multitasking functionality because it allows users to use device functionality while continually running the send processes in the background. This background send processing can only occur because user credential data for the destination system has been stored for each send job in the send queue requiring no further user input at the time when the send job is executed.

This advantage is most prominent when understood from the scan and send task that is commonly employed by image processing devices. Typically, a scanning job includes scanning of at least one physical document and translating the captured image into electronic document data. This may include creation of a first version of the electronic document in a first data format (e.g. a device specific data format that may or may not be a proprietary image format). Thereafter, a send job that communicates the electronic document data to a destination system may require a conversion of the first version of the electronic document into a second version of the electronic document in a second, different data format followed by a transmission of the converted electronic document to a destination system. For example the second data format may be a user-specified format (e.g. PDF, JPG, etc.). However, the creation of the first electronic document via an image capture is completed prior to the conversion of the first electronic document and transmission of the converted the electronic document.

This image processing device advantageously enables another user to make user of resources on the image processing device immediately after the image capture operation initiated by the first user is completed while enabling the electronic document creation and conversion, along with any subsequent sending operation to be complete in the background while another user is making use of the image processing device. This is enabled because the user credentials entered by the first user are automatically stored in the data object along with the electronic document data for later use by the sending task. Thus there can be multiple sending jobs running simultaneously in background.

In another embodiment, the image processing device can selectively manage the concurrently running tasks by monitoring data associated with device resources to selectively determine which tasks requested by the various users can be employed at a given time. For example, the device resources may include, but are not limited to, memory, network bandwidth, or the task-specific processes (e.g. aspects of the sending process that includes image converting process which may not be thread safe and only allow one job can to be executing at a given time). To remedy any conflicts presented by different requirements of different tasks, the scan and send job is separated into separate scan jobs and send jobs. In this manner, the send job is queued after scanning instead of being executed right away and a sending processor will pull the send jobs from the queue and run them based on device resources. The sending processor can control the number of concurrent send jobs based on the device sending capability (e.g. memory, network bandwidth and image conversion limitation). When the sending job is queued, the credentials for the corresponding destination can be queued with the job so that when the job is executed, the credentials are available for authenticating to the sending destination. Thus, the image processing device according to invention principles breaks the barrier of the login session and queues the sending jobs with the corresponding credentials for authenticating to the sending destination thereby maximizing the efficient use of the image processing device.

Embodiments of the present invention are described with reference to the drawings. FIG. 1 illustrates an example network environment 100. An image processing device 101 having a user interface 102 and an application 103, one or more printer(s) 104, one or more fax machine(s) 105, and one or more server(s) 106, which may each be coupled to one or more data store(s) 107, are connected to a network 108.

The image processing device 101 includes hardware, software, or both for providing the functionality of the image processing device 101. In some embodiments, the image processing device 101 performs one or more steps of one or more methods described or illustrated herein. In some embodiments, the image processing device 101 provides functionality described or illustrated herein. In some embodiments, software running on the image processing device 101 performs one or more steps of one or more methods described or illustrated herein or provides functionality described or illustrated herein. Particular embodiments include one or more portions of the image processing device 101.

In some embodiments, the image processing device 101 includes hardware, software, or both for providing scanning functionality. For example, the image processing device 101 may include an image sensor or a camera for capturing an image. In some embodiments, the image processing device 101 scans a physical document to generate electrical signals which are converted to digital image data representing the scanned physical document. The image processing device 101 may convert the digital image data into an electronic document representing the scanned physical document and send the electronic document to a destination. In some embodiments, the send functionality may include a conversion of the electronic document from a first data format to a second data format during the transmission of the document to the destination (e.g. convert and stream the electronic document to the destination). In other embodiments, the send functionality may include a conversion of the electronic document from a first data format into a second data format to generate data object that is temporarily stored (e.g. in memory or on a storage medium) until the conversion is complete. In this embodiment, the transmission of the converted document occurs upon receiving a notification that the generation of the data object including the converted electronic document has been completed. Once completed, the temporary data object may be deleted from the memory or storage medium.

The image processing device 101 includes the user interface 102. The user interface 102 includes hardware, software, or both for providing the functionality of the user interface 102. The user interface 102 may include an operation panel. The user interface 102 may output signals and receive input signals via the operation panel so as to facilitate interaction between a user and the image processing device 101. An operation panel may include a hard key panel and/or a touch sensitive display. A user may provide user input operations via the hard key panel and/or the touch sensitive display to control the image processing device 101 via the operation panel. For example, the user may press one or more hard buttons to issue one or more commands. Further by way of example, a user may provide a touch input to an interface element displayed on the display to issue a command and/or to make a selection. Moreover, the image processing device 101 may output information to the user and issue requests by outputting images on a display.

In some embodiments, a browser may execute on the image processing device 101. In some embodiments, the user interface 102 comprises information displayed by the browser. The browser may be a web browser such as MICROSOFT INTERNET EXPLORER or MOZILLA FIREFOX, and may be used to access a resource, such as a web page. The browser may enable a user to display and interact with text, images, form elements, or other information typically located on a web page served by a web server on the World Wide Web or a local area network. The browser may support various types of downloadable, executable, software modules, such as applets or plug-ins. For example, the browser may incorporate a virtual machine configured to execute a program, such as a JAVA applet, embedded in a web page accessed by the browser. The image processing device 101 may have various add-ons, plug-ins, or other extensions for use in or with the browser.

The application 103 includes programs and related data. In some embodiments, the application 103 executing on the image processing device 101 performs one or more steps of one or more methods described or illustrated herein or provides functionality described or illustrated herein. By way of example and not by way of limitation, programs of the application 103 may include instructions which, when executed by one or more processors, cause the one or more processors to perform one or more operations described with respect to the Figures described hereinbelow.

In some embodiments, the application 103 includes one or more programs for controlling access to one or more resources on the image processing device 101. In some embodiments, the application 103 includes one or more programs for controlling access to the application 103 and/or particular functionality of the application 103. In some embodiments, access to one or more resources of the application 103 is controlled based on a credential associated with the entity attempting to access the one or more resources of the application 103. Policies for controlling access to various resources of the application 103 may be stored at the image processing device 101. In some embodiments, the application 103 includes one or more programs for accessing services, such as an authentication service. For example, the application 103 may cause the image processing device 101 to send to an authentication service on the network 108 a request to authenticate a user before the user is granted access to a resource of the image processing device 101 and/or the application 103.

Once logged in to the application 103, a user gains access to one or more resources of the application 103, including task-specific functionality of the application 103. The task-specific functionality of the application 103 may enable the user to perform one or more tasks using the application 103. For example, the application 103 may provide various functions, features and user interfaces for processing image data, transmitting data over a network, managing one or more databases, or other tasks. In some embodiments, the application 103 is configured to use one or more resources of the image processing device 101 to perform a process in response to an instruction from the user. For example, the application 103 may use functionality of and/or information on the image processing device 101 to carry out a scan and send process based on user inputs.

In some embodiments, the application 103 executing on the image processing device 101 provides functionality for maintaining and accessing information in a data structure, which may be any suitable data structure for organizing data. For example, information associated with a user or process may be added as one or more entries into a data structure. The application 103 executing on the image processing device 101 may store and/or retrieve data in a memory or on a hard disk of the image processing device 101. In some embodiments, the image processing device 101, when executing the application 103, may perform various operations with respect to a data store. Examples of operations include adding entries to a data store; deleting entries from a data store; modifying entries in a data store; searching for entries in a data store; and retrieving entries from a data store.

The application 103 executing on the image processing device 101 may provide functionality for generating information and providing the information to the user interface 102 of the image processing device 101. The information may include text, images, form elements, files, executable programs, or other suitable information. The information provided by the application 103 may include content for display on a display of the image processing device 101.

The image processing device 101 may access one or more resources on the network 108. The image processing device 101 is configured to interact with one or more of the following: the one or more printer(s) 104, the one or more fax machine(s) 105, and the one or more server(s) 106.

The one or more printer(s) 104 is/are any suitable device(s) for printing. The one or more printer(s) 104 may include one or more multifunction peripherals, one or more copiers, one or more single-function printers, or other device(s) with printing capabilities. In some embodiments, at least one of the one or more printer(s) 104 is coupled to at least one of the one or more fax machine(s) 105 and may print data sent from the fax machine(s) 105 to the printer(s) 104.

The one or more fax machine(s) 105 is/are any suitable device(s) for sending and receiving a facsimile communication. In some embodiments, at least one of the one or more fax machine(s) 105 may receive a digital facsimile communication. In some embodiments, at least one of the one or more fax machine(s) 105 may receive an analog facsimile communication. The one or more fax machine(s) 105 may provide scanning functionality. For example, the one or more fax machine(s) 105 may include an image sensor or a camera for capturing an image. The one or more fax machine(s) 105 may scan a physical document to generate a facsimile communication representing the scanned physical document. In some embodiments, at least one of the one or more fax machine(s) 105 may generate an analog signal and send the analog signal to a destination. In some embodiments, at least one of the one or more fax machine(s) 105 scans a physical document to generate electrical signals which are converted to digital image data representing the scanned physical document. The digital image data may be converted into an electronic document representing the scanned physical document and sent to a destination.

At least one of the one or more fax machine(s) 105 is/are able to send and receive facsimile communications over the Public Switched Telephone Network (PSTN). At least one of the one or more fax machine(s) 105 is/are able to send and receive facsimile communications over the Internet. At least one of the one or more fax machine(s) 105 is/are able to send and receive facsimile communications over both the PSTN and the Internet.

In some embodiments, at least one of the one or more fax machine(s) 105 include(s) printing capabilities for printing received facsimile communications. In some embodiments, at least one of the one or more fax machine(s) 105 is coupled to at least one of the one or more printer(s) 104 and sends data to the printer(s) 104 for printing.

The one or more server(s) 106 each include hardware, software, or both for providing the functionality of the respective one or more server(s) 106. In some embodiments, at least one of the one or more server(s) 106 is unitary. In some embodiments, at least one of the one or more server(s) 106 is distributed. At least one of the one or more server(s) 106 may span multiple locations. At least one of the one or more server(s) 106 may span multiple machines. In some embodiments, two or more of the one or more server(s) 106 reside in a single computing system in any suitable manner. In some embodiments, at least one of the one or more server(s) 106 includes software that is provided as a part of a software application. In some embodiments, at least one of the one or more server(s) 106 includes software that is provided as a stand-alone software application.

In some embodiments, at least one of the one or more server(s) 106 provides one or more network services for the image processing device 101. Examples of network services include directory services, authentication services, naming services, and secure access to resources on the network 108. In some embodiments, at least one of the one or more server(s) 106 receives one or more files from the image processing device 101 when the image processing device 101 executes a scan and send process. One or more of the server(s) 106 may be coupled to one or more of the data store(s) 107.

In some embodiments, at least one of the one or more server(s) 106 provides an authentication service. The image processing device 101 and/or the application 103 on the image processing device 101 may use the authentication service to authenticate a network entity, such as a user, seeking access to resources on the image processing device 101. The authentication service may use the Kerberos protocol or other suitable authentication method to authenticate the network entity. The authentication service may be coupled to one of the data store(s) 107, which may contain account information for network entities. The account information may include an object and its attributes. An object may represent a user or another entity within the network 108. Attributes for a user account may include, for example, the user's password, a smart card identification number, or group membership information indicating a group to which the user belongs. When providing authentication services, the authentication service may access account information in the data store 107 for the relevant entity and provide an authentication result.

In some embodiments, at least one of the one or more server(s) 106 is a file server. In some embodiments, at least one of the one or more server(s) 106 is a mail server. In some embodiments, at least one of the one or more server(s) 106 is a web server. In some embodiments, at least one of the one or more server(s) 106 is an application server. In some embodiments, at least one of the one or more server(s) 106 is a fax server. In some embodiments, at least one of the one or more server(s) 106 is a database server.

The network 108 couples one or more servers and one or more clients to each other. The network 108 may be any suitable network. For example, one or more portions of the network 108 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. The network 108 may include one or more networks.

Figure 2A:
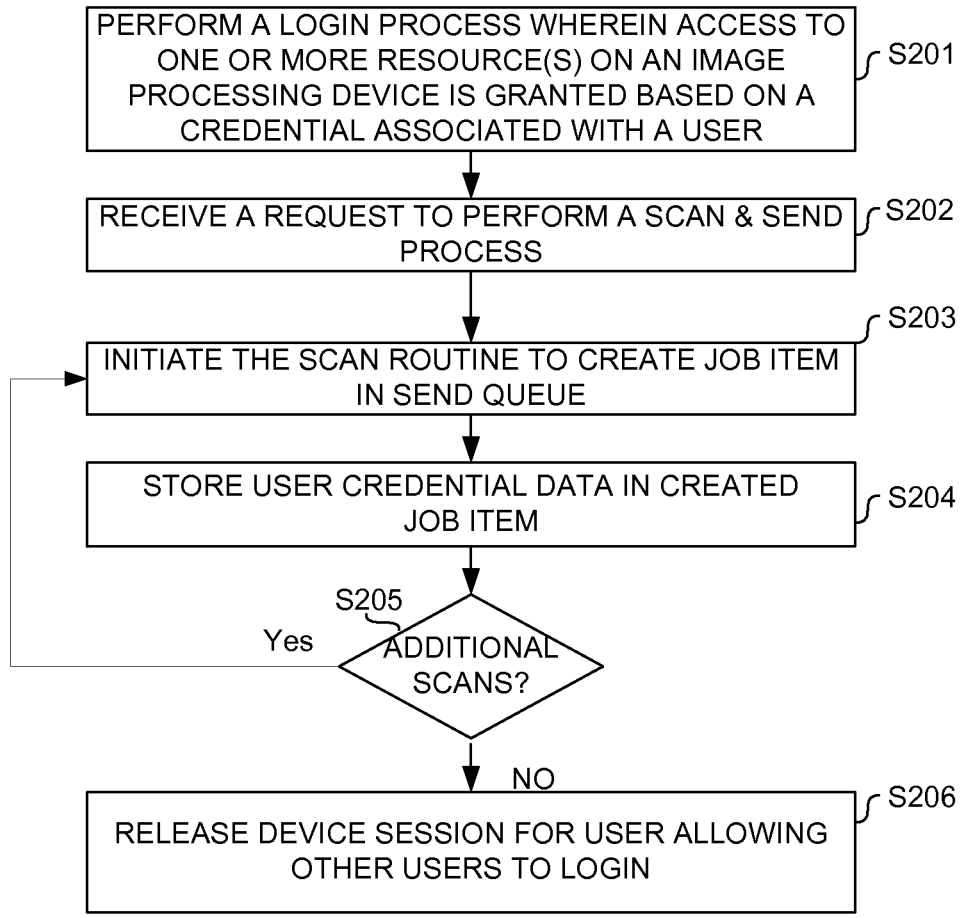
FIGS. 2A & 2B illustrates an example flow of operations at an image processing device.

FIG. 2A is described with reference to the example network environment 100 of FIG. 1. FIG. 2A illustrates an example flow of operations at the image processing device 101.

In step S201, a login process is performed whereby the user enters at least one credential that can be evaluated when determining if a user is able to access a certain at the image processing device 101 or application executing on the image processing device. In one embodiment, the login process of step S201 may be one of a global device login process. In other embodiments, the login process S201 includes an application specific login such that the user has selected a particular application or task and that particular application or task may require a user to login. Examples of the credential include the following: user identification information (for example, a username), a password, security token information (for example, a token identifier such as the identification number of a smart card), a PIN, biometric information, a certificate, other information associated with the user, or a combination of two or more of these.

In some embodiments, step S201 includes receiving the credential from a user. A user may provide one or more inputs at an operation panel of the image processing device 101. For example, the user may input a username and password by providing touch inputs to interface elements displayed on a touch sensitive display and/or by pressing one or more hard buttons on a hard key panel. Additionally or alternatively, a user may provide one or more inputs via one or more input/output (I/O) port(s) of the image processing device 101 that enable one or more external device(s) to communicate with the image processing device 101. For example, the user may provide information to the image processing device 101 via a near field communication (NFC) interface, a smart card reader, radio-frequency identification (RFID) reader, device for detecting biometric information, a keyboard, or other suitable external device connected to the image processing device 101 via an I/O port.

In some embodiments, step S201 includes retrieving the credential. For example, the application 103 executing on the image processing device 101 may provide functionality for retrieving the credential from a storage location, such as a memory on the image processing device 101 or a remote storage location. The application 103 executing on the image processing device 101 may retrieve the credential in response to receiving an event notification. For example, the application 103 may include single sign-on functionality and may retrieve the credential in response to receiving notification of a user login event.

After obtaining the credential, the application 103 running on the image processing device 101 determines whether the credential is valid. In some embodiments, an authentication service is used to determine whether the credential is valid. For example, the authentication service and the application 103 running on the image processing device 101 may communicate and execute various processes according to an authentication protocol such as Kerberos or other suitable authentication protocol, in order to determine whether the credential is valid. In some embodiments, the application 103 running on the image processing device 101 determines whether the credential is valid by comparing the credential to user information on an access control list stored locally.

In response to determining the credential is valid, access is granted to one or more resources on the image processing device 101. For example, a login session is established for the user such that the user is logged in to the application 103 on image processing device 101 by virtue of the credential. On the other hand, in response to determining the credential is not valid, access to the one or more resources on the image processing device 101 is denied and the process ends.

In step S202, a request to perform a scan and send process is received at the image processing device. The scan and send process includes two sub-processes or tasks: the scan routine and the send routine. These sub-processes need not occur in sequence as the send process of the particular scan and send request may occur at a time after the scan routine has been completed including when further scan routines associated with further scan and send requests are being processed. In some embodiments, the request to perform the scan and send process comprises instructions for scanning a physical document and sending an electronic document representing the scanned physical document to a destination. The request to perform the scan and send process is received at the image processing device 101 while the user is logged in to the application 103 on image processing device 101. In other embodiments, the user may be prompted to enter user credential data in a manner discussed above after the scan and send request has been initiated.

In some embodiments, the request to perform the scan and send process is based on one or more user inputs via an operation panel of the image processing device 101. The one or more user inputs may include a user input via a hard key panel of the image processing device 101. For example, the user may press a start button in order to submit the request to perform the scan and send process. The one or more user inputs may include a user input via a touch sensitive display of the image processing device 101. For example, the user may touch an interface element displayed on a touch sensitive display in order to submit the request to perform the scan and send process. The request to perform the scan and send process may include an instruction to perform an image scanning operation on multiple physical documents placed in an automatic document feeder (ADF) of the image processing device 101.

In some embodiments, the request to perform the scan and send process includes information pertaining to the scanning operation. For example, the request to perform the scan and send process may include scan settings pertaining to a resolution of the scan, color or black and white settings, contrast settings, file type settings for the electronic document resulting from the scan operation, or other scan settings for the scanning operation. The scan settings included in the request to perform the scan and send process may be preset or default settings stored in the image processing device 101. In some embodiments, the scan settings included in the request to perform the scan and send process may be custom settings set in the image processing device 101 by a user via an operation panel of the image processing device 101. In some embodiments, the scan settings may be considered characteristics of an electronic document. In other embodiments, electronic document characteristics may include at least one of (a) file size (in bytes) of the electronic document, (b) a total number of pages represented in the electronic document, and (c) a priority level associated with the electronic document.

In some embodiments, the request to perform the scan and send process includes instructions for sending an electronic document representing the scanned physical document to a destination. By way of example and not by way of limitation, the request may include one or more of the following as destination information: a path for a network directory, a uniform resource locator (URL) associated with a web application, a URL associated with a File Transfer Protocol (FTP) server, a fax number, an electronic mail (email) address, or other suitable information indicating a destination for the electronic document. In some embodiments, the request to perform the scan and send process may include instructions for sending the electronic document to multiple destinations. In some embodiments, instructions for sending the electronic document to one or more destinations are set at the image processing device 101 by a user via an operation panel of the image processing device 101. In some embodiments, instructions for sending the electronic document to one or more destinations may be automatically set based on preset or default settings associated with the logged-in user.

In some embodiments, the request to perform the scan and send process includes other information related to the scan and send process. For example, the request to perform the scan and send process may include information that identifies a matter (for example, a matter identifier) or a client (for example, a client identifier) associated with the scan and send process. In some embodiments, the request to perform the scan and send process further includes a file name for the file resulting from the scan and send process. The information that identifies a matter, the information that identifies a client, and the file name may each be set by a user via an operation panel of the image processing device 101 or may be automatically set based on preset or default settings.

In step S203, the scan routine associated with the scan and send process is initiated. In some embodiments, the image processing device 101 scans one or more physical documents via an image capture process. A physical document may, for example, be placed on a glass platen or in an ADF of the image processing device 101. In some embodiments, multiple physical documents have been placed in the ADF of the image processing device 101. A scanner unit of the image processing device 101 performs a scanning operation on successive sheets of the one or more physical documents. An image sensor scans each physical document to generate electrical signals which are converted to digital image data representing each scanned physical document. The digital image data is converted into an electronic document representing the one or more scanned physical documents. In some embodiments, the electronic document representing the scanned physical document is stored in a memory or a storage medium of the device in a first electronic data format which may or may not be a device-specific format At the completion of the scan process resulting in the generation of the electronic document representative of physical documents, a data object is created in a data structure in a memory (or on a storage medium) of the image processing device. The data object created includes job data associated with the requested scan. The resulting job data includes electronic document data representing all of the pages of the physical document scanned by the scanner in a first data format. In some embodiments, the job data also includes address data representing the destination to which the scanned electronic document is to be transmitted. Address data may include at least one of (a) a web address; (b) an electronic mail address; (c) a link to a resource on a network; and (d) executable program code for initiating access to an application stored on a remote server. These types of address data are described for purposes of example only and any type of data that may allow a sending application to access a destination system may be used.

In step S204, the user credential data acquired in step S201 is stored in the data object created in step S203 thus linking the user credential with the job data. For example the data object may include a plurality of sub-objects where a first sub-object represents the job data and a second sub-object represents the user credential data associated with the user who initiated the job and which are required to access a destination system. In some embodiments, the user credential data may include a user name and password associated with the destination system. In other embodiments, the user credential data may include a token that can be received by the destination system to grant access thereto. In other embodiments, the user credential data may include a link for accessing remotely stored user credential information that can be downloaded and used by the destination system.

In other embodiments, prior to storing user credential data, the application may generate a user interface display for display to a user questioning whether or not the user credentials entered in step S201 are the necessary credentials for accessing the destination system. For example, the user credentials entered in S201 may be required for accessing resources and applications executing on the particular image processing device 101. However, the destination system for the scanned electronic document may require a second different set of user credentials. In this embodiment, the application 103 advantageously presents, via the user interface on the operation panel, the ability for a user to enter secondary user credential data. The manner in which these secondary user credential data is entered may include any of the methods of entering user credential data described above in step S201. Once entered, the application marks these secondary user credentials as such and stores the secondary user credentials in the data object associated with the scan job initiated in step S203. Thus, when the application 103 processes the job data in the queue, the application will recognize that the secondary user credential information is needed in order to communicate the electronic document to the destination system.

In step S205, the application 103 queries whether or not any further scan requests have been detected. A further scan request is indicative of the user wishing to scan additional physical documents and execute the image capture process to generate electronic documents representative thereof. If the result of the query in step S205 is positive, the algorithm reverts to step S203 allowing the user to scan additional documents. In some embodiments, the query in S205 may determine whether the user wishes to capture images of other physical documents for transmission to the same destination from S203. In other embodiments, the query in S205 determines whether the user wishes to capture images of other physical documents for transmission to a destination other than the destination specified in S203.

If the result of the query in step S205 is negative, the application enables the device session for the user to be released to allow other users to login and make use of device resources or applications executing on the device. The application 103 may automatically shift the send processing associated with the requested scan and send job to a background processing session. The background processing session allows any processing relating to the sending of the electronic document to proceed while allowing the user of the device or other users to access other resources on the image processing device or initiate additional tasks on the image processing device 101.

In some embodiments, step S208 includes the application 103 determining whether or not there has been a logout command received at the image processing device 101. The log out command may be based on the occurrence of an event that causes the user to be logged out of the application 103. Examples of events that may cause the user to be logged out of the application 103 include but are not limited to the following: receiving a user input to a touch sensitive display at a position where an interface element for logging out of the application 103 is displayed; navigating away from the application 103 in a graphical user interface displayed on the image processing device 101; receiving a user input to a reset button on the hard key panel of the image processing device 101; and determining that a lapse of a predetermined amount of time has occurred without receiving a user input operation.

In some embodiments, step S206 includes terminating the user's login session on the application 103 and deleting data associated with the user's login session. In some embodiments, the application 103 terminates the user's login session on the application 103 by causing processes belonging to the user's login session on the application 103 to be terminated. In some embodiments, the application 103 deletes data associated with the user that was received in step S201. For example, the application 103 may delete information that identifies the user (such as a username or other identifier), the credential, domain information, or other data associated with the user or the user's session. In some embodiments, the application 103 deletes data associated with one or more scan and send process(es) that were completed during the user's login session. For example, the application 103 may delete information received in step S202 in conjunction with the request to perform a scan and send process. In some embodiments, the application 103 deletes graphical user interface information associated with the user or the user's session. The application 103 may delete information from one or more storage locations. Data may be cleared from a cache memory, deleted from other memory, erased from a hard disk, or removed from another data storage device.

In step S206, in response to shifting the processing to the background session, the application 103 releases a device access session which allows others users to perform the login of step S201. In step S206, a login screen is presented in the user interface 102 of the image processing device 101 while execution of the scan and send process continues in the background. The send processing continues executing even though an active screen for the application 103 is no longer displayed in the user interface 102 for the user. In some embodiments, the application 103 prepares a login page for display. The login page may include information corresponding to the appropriate credential necessary for login, or other information to aid a user. For example, the login page may include fields for receiving data. In some embodiments, the login page is prepared but not displayed in the user interface 102 until a user seeks to access the application 103. Since the processing necessary to prepare the login page is completed prior to the user's accessing the application 103, the page can quickly be presented when the user seeks to access the application 103.

In some embodiments, a user other than the user associated with the send process executing the in background signs in to the application 103 while the scan and send process is executing in the background. Information associated with the send process executing in the background may not be visible to the currently logged-in user. Additionally, the currently logged-in may not be able to access data or interfere with processes associated with the scan and send process executing in the background. For example, the instructions for the scan and send process continue to be executed but information associated with the scan and send process is not presented in the user interface 102.

Figure 2B:
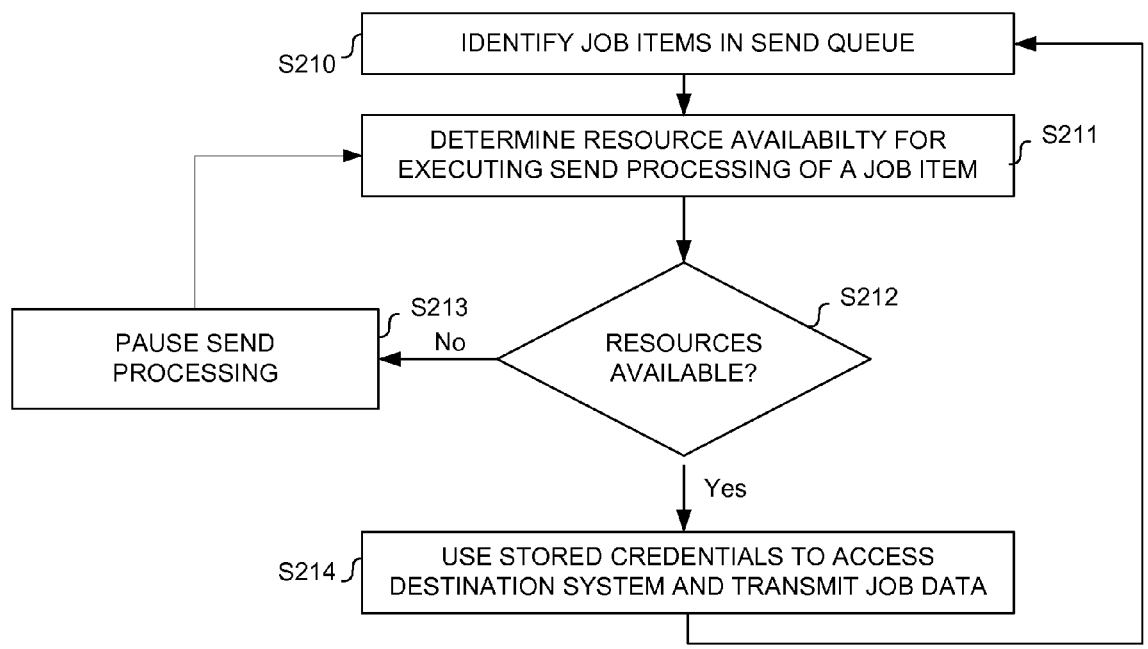

FIG. 2B describes the operational flow associated with the send process. In some embodiments, the activities described herein occur immediately after the completion of S206 in FIG. 2A. In other embodiments, the activities described in FIG. 2B occur at a predetermined after the completion of a particular scan routine. In other embodiments, the activities of FIG. 2B may occur simultaneously with activities described above in FIG. 2A.

The send routine of the scan and send process is initiated in step S210 that is continually executing in the background session. In step S210, the application 103 parses job items representative of scan jobs stored in the send queue. For each identified job in the send queue, the application 103 proceeds to execute steps S211-S214 as described below.

In step S211, the availability of at least one resource of the image processing device 101 to determine whether or not a queue job can be communicated to the destination system. The resources include but are not limited to, device memory, available bandwidth, other concurrently executing processes. In this manner the application 103 is able to generate an impact parameter that combines one or more of (a) data associated with one or more resources of the image processing device 10, (b) data associated with the electronic document in the queued job, and (c) data associated with the destination system. If the value of the impact data is below a predetermined impact threshold which indicates that transmission of the queued job would not severely impact operation of the image processing device 101, then the send routine may be initiated. Severely impacting operation may include preventing the image processing device from accessing one or more resources, tasks or applications to execute further functionality such as copy, print, scan or other activities. Moreover, the impact threshold will be device dependent and based on the hardware and software capabilities of each device and the network configuration of each device.

The application 103 queries whether or not sufficient resources for executing the sending routine of the scan and second request in step S213. For example, the application can determine, based on the size of the data object stored in the queue, whether or not the image processing device has sufficient available memory to transmit the job data to the destination system. In other embodiments, the determination in step S213 may include monitoring incoming and outgoing network traffic to determine if there are available slots for transmission of data packets across the network. In other embodiments, the determination in step 23 may include identifying whether or not a non-thread safe process is being executed by the image processing device 101 thereby limiting the ability of the image processing device to execute the send routine. These are described for purpose of example only and the application 103 may monitoring any characteristic of the image processing device and use that determine how and when the job data stored in the created data object is to be communicated to the destination system. Each of the above examples may be used in generating the impact parameter.

If the result of the query in step S213 is negative, the application 103 pauses for a predetermined period of time in step S213 and then reverts back to step S213 to make a further determination as to the available of device resources. If the result of the query in step S213 is positive indicating that sufficient resources exist, the application 103 uses the stored user credential data in the data object to access the destination system and communicate the job data of the data object to the destination system in step S214.

In some embodiments, step S214 includes converting the digital image data in the first data format into the electronic document in a second data format. In doing so, one or more processor(s) of the image processing device 101 perform format conversion processing. For example, one or more processor(s) of the image processing device 101 may convert the digital image data to an electronic document in a particular file format, such as portable document format (PDF), a TIFF file format, or some other file format for sending the electronic document to a destination. In some embodiments, the image processing device 101 executes one or more other image processing techniques on the electronic document, such as optical character recognition (OCR).

Instructions for performing file format conversion or for performing various image processing techniques may be stored in a storage device of the image processing device 101 and may be executed by one or more processor(s) of the image processing device 101. In some embodiments, commands for performing these or other image processing techniques may be included in the request to perform the scan and send process. For example, the request to perform the scan and send process may indicate a format into which the digital image data should be converted for sending the electronic document representing the scanned physical document(s) to a destination.

After performing image processing, and generating the electronic document representing the scanned physical document(s), the image processing device 101 sends the electronic document to the destination specified in the request. The time required to complete the send process initiated in step S214 may vary depending upon, for example, a number documents, the type(s) of image processing to be performed, and the method of transmitting the data to the destination.

In some embodiments, the application 103 monitors the progress of the transmission in step S214 and, if the transmission is completed, the application 103 monitors the queue of data objects to identify and determine if other queue data objects representing jobs created by this or other users are ready for transmission via the send routine and reverts back to step S210 to repeat this process.

It should be noted that all of steps S210-S241 occur in the background. This background processing for completing the job and transmitting the job advantageously improves the efficiency of image processing device operation by maximizing the availability of all resources on the device while maintaining any security requirements associated with any specific task initiated by a user.

It should also be noted that, the description of this process being associated with a scan and send request is described for purposes of example only and the storage of user entered credentials with a currently executing job of any type may be readily extended to other tasks available to users on an image processing device. More specifically, this may readily be used in processing of facsimiles initiated by a user of the image processing device. In other embodiments, this may be applied in a remote printing request whereby the documents are scanned in and provided to a remotely located printing device that requires a user to be authenticated in order to have any documents printed thereon. ¥

In other embodiments, for every task initiated by a user, the user entered credentials can be stored and directly associated with any job data created by the initiated task to allow for any task-specific processing to occur in the background after a user has logged out but ensure that the requesting users credentials are the credentials used in completing the task specific processing while allowing other users to utilize the image processing device for their own purposes.

Because the activities in FIGS. 2A and 2B may occur simulataneously, in some embodiments, a request to perform a second scan and send process may be received and the second scan and send process initiated while execution of another scan and send process is still in progress. For example, image processing for a first scan and send process may be in progress after completion of a scanning operation for the first scan and send process. And during execution of the image processing for the first scan and send process, the second scan and send process may be initiated at the image processing device 101. Accordingly, multiple scan and send processes may be in progress simultaneously, according to some embodiments.

Figure 3:
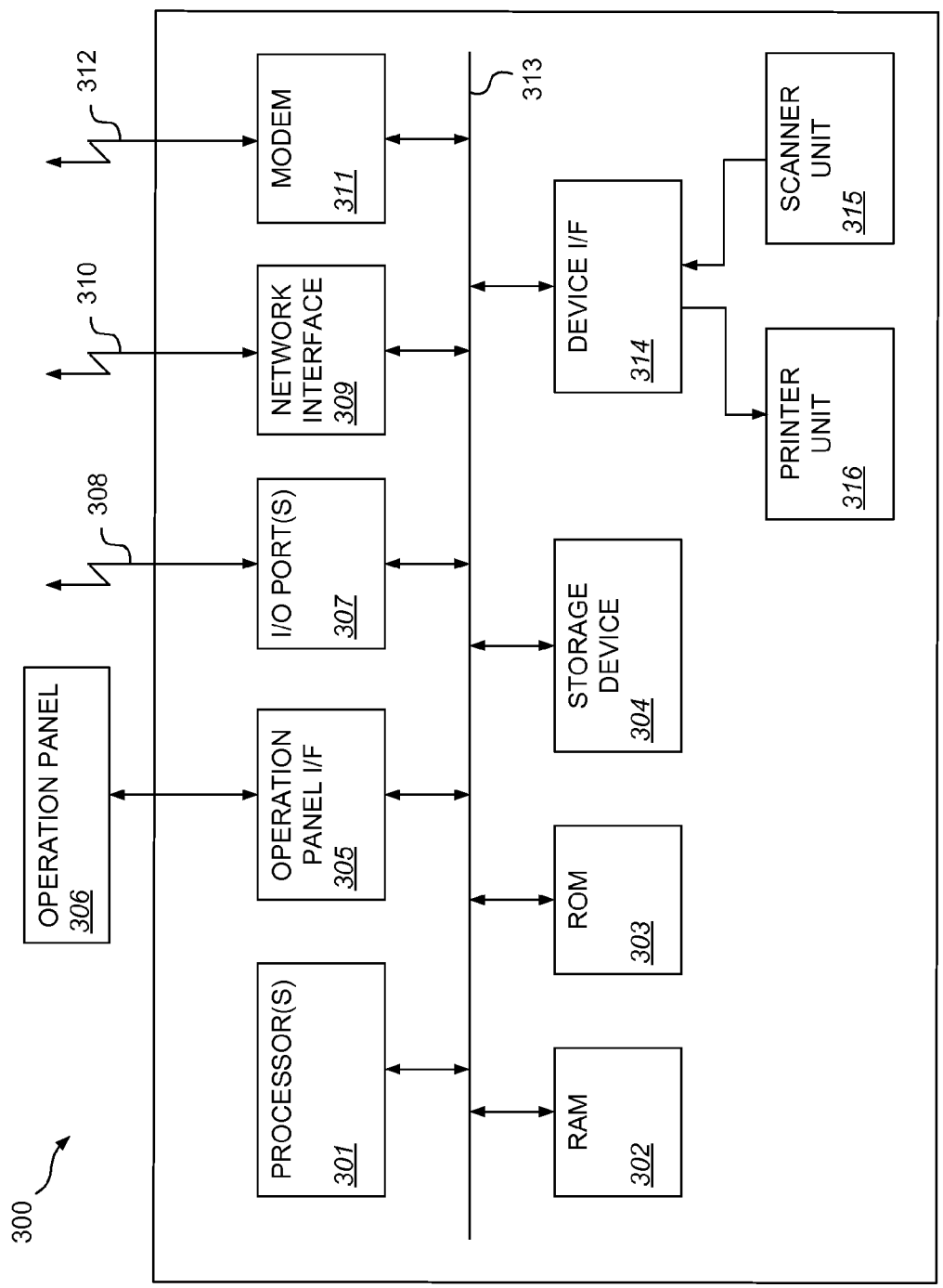
FIG. 3 illustrates an example image processing device.

FIG. 3 illustrates an example image processing device 300. In some embodiments, the image processing device 101 of FIG. 1 comprises the image processing device 300. The image processing device 300 of FIG. 3 is a multifunction peripheral having a scanning function in addition to printing, copying and other functions. However, it will be understood that various other implementations of an image processing device are within the scope of the present invention. For example, various components, modules, functions, and/or configurations of the image processing device 300 of FIG. 3 could be combined, deleted, or modified to form further implementations. Further by way of example, in some embodiments, other devices (for example, a stand-alone scanner, fax machine, or other device with scanning capabilities) and/or computing systems (for example, a computer connected to a scanner) may be implemented as the image processing device 300.

In some embodiments, the image processing device 300 performs one or more operations described herein. In some embodiments, the image processing device 300 provides functionality described herein. In some embodiments, software running on the image processing device 300 performs one or more operations described herein.

The image processing device 300 includes one or more processor(s) 301. The processor(s) 301 include a central processing unit (CPU) that performs overall control functions for the image processing device 300. The CPU uses a random access memory (RAM) 302 as a work area while executing instructions. The CPU executes instructions of various programs stored in one or more memory devices. For example, the CPU executes programs stored in a read only memory (ROM) 303 and in a storage device 304.

In some embodiments, the processor(s) 301 include one or more processors in addition to the CPU. By way of example, the processor(s) 301 may include one or more general-purpose microprocessor(s), application-specific microprocessor(s), and/or special purpose microprocessor(s). Additionally, in some embodiments the processor(s) 301 may include one or more internal caches for data or instructions.

The processor(s) 301 provide the processing capability required to execute an operating system, application programs, and various other functions provided on the image processing device 300. The processor(s) 301 perform or cause components of the image processing device 300 to perform various operations and processes described herein, in accordance with instructions stored in one or more memory devices.

The RAM 302 is used as a work area when the processor(s) 301 execute various instructions, such as those making up computer programs stored in the ROM 303 and/or the storage device 304. The RAM 302 may be used as a temporary storage area for various data, including input image data. The RAM 302 may be used as a cache memory. In some embodiments, the RAM may be dynamic RAM (DRAM) or static RAM (SRAM).

The ROM 303 stores data and programs having computer-executable instructions for execution by the processor(s) 301. In some embodiments, the ROM 303 is a boot ROM, storing instructions for the booting process. In some embodiments, the ROM 303 may be flash memory.

The storage device 304 stores application data, program modules and other information. One or more program modules stored in the storage device 304 are configured to cause various operations and processes described herein to be executed. For example, in some embodiments, the storage device 304 stores instructions for generating and providing to a computing system a web page including an embedded executable program which, when executed on the computing system, is operable to obtain a ticket-granting ticket stored on the computing system and send the ticket-granting ticket to another computing system; determining whether a user associated with the ticket-granting ticket is authorized to access a protected resource comprising a web page; or a combination of these, in accordance with embodiments described herein. In some embodiments, the application 103 resides on the storage device 304 and executes on the image processing device 300.

The storage device 304 also stores other programs and data to be processed. For example, the storage device 304 stores an operating system including programs and data for managing hardware and software components of the image processing device 300. Applications on the image processing device 300 may utilize the operating system to perform various operations. The storage device 304 may further store other programs and/or drivers that enable various functions of the image processing device 300, graphical user interface (GUI) functions, and/or processor functions. The storage device 304 may also store data files including, for example, image data, user data, configuration information, GUI components, such as graphical elements or templates, or other data required by the image processing device 300.

In some embodiments, the image processing device 300 may include other storage media. By way of example, and not by way of limitation, the storage media may include a floppy disk drive, flash memory, an optical disc, a magneto-optical disc, magnetic tape, or a Universal Serial Bus (USB) drive or a combination of two or more of these. Where appropriate, the storage media may include removable or fixed media. Where appropriate, the storage media may be internal or external to the image processing device 300. In some embodiments, the storage media is non-volatile, solid-state memory. The storage media may take any suitable physical form. For example, the storage media may be in the form of one or more removable blocks, modules, or chips. The computer-readable storage medium need not be one physical memory device, but can include one or more separate memory devices.

An operation panel interface 305 provides output signals to and receives input signals from an operation panel 306. Regarding the output signals, the operation panel interface 305 provides GUI data to the operation panel 306 for display on a liquid crystal display (LCD). Regarding the input signals, the operation panel interface 305 receives input signals based on user input operations at the operation panel 306 and relays the input signals to the processor(s) 301. In some embodiments, the operation panel 306 includes a touch sensitive element operable to receive user input operations or commands based on the touching of graphical objects displayed on the LCD. In some embodiments, the operation panel 306 includes a hard key panel.

The image processing device 300 includes one or more input/output (I/O) port(s) 307. The I/O port(s) 307 may include any suitable interface type such as a universal serial bus (USB) port, FireWire port (IEEE-1394), serial port, parallel port, or AC/DC power connection port. The I/O port(s) 307 enable one or more external device(s) 308 to communicate with the image processing device 300 when the external device(s) 308 is/are connected to the I/O port(s) 307. Examples of external devices 308 include a near field communication (NFC) interface (for example, an NFC reader), a smart card reader, radio-frequency identification (RFID) reader, device for detecting biometric information, a keyboard, keypad, sensor(s), a combination of two or more of these, or other suitable device.

A network interface 309 includes hardware, software, or both providing one or more interfaces for communication (such as, for example, packet-based communication) between the image processing device 300 and one or more other computing systems or one or more networks 310. As an example and not by way of limitation, the network interface 309 may include a network interface card (NIC) or a network controller for communicating with an Ethernet or other wire-based network or a wireless NIC (WNIC) or wireless adapter for communicating with a wireless network, such as a WI-FI network. This disclosure contemplates any suitable network 310 and any suitable network interface 309 for it. As an example and not by way of limitation, the image processing device 300 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks 310 may be wired or wireless. As an example, the image processing device 300 may communicate with a wireless PAN (WPAN) (such as, for example, a BLUETOOTH WPAN), a WI-FI network, a WI-MAX network, or other suitable wireless network or a combination of two or more of these. The image processing device 300 may include any suitable network interface 309 for any of these networks 310, where appropriate.

A modem 311 modulates/demodulates image data and control signals. The modem 311 is connected to the Public Switched Telephone Network (PSTN) 33 and performs input/output of information between the image processing device 300 and the PSTN 33. By way of example, the modem 311 may send/receive facsimile communications.

A system bus 313 interconnects various components of the image processing device 300 thereby enabling the transmission of data and execution of various processes. The system bus 313 may include one or more types of bus structures including a memory bus or memory controller, a peripheral bus, and a local bus using any of a variety of bus architectures.

The device interface 314 is connected to the scanner unit 315 and to the printer unit 316. The device interface 314 performs synchronous/asynchronous conversion of image data.

The scanner unit 315 includes a light source and an image sensor. The scanner unit 315 may include a glass platen and/or an automatic document feeder (ADF). In operation, the light source illuminates a physical document positioned on the glass platen or fed by the ADF. Light reflected by the physical document reaches the image sensor, and the image sensor converts the light into electrical signals. In some embodiments, the scanner unit 315 includes an optical system (for example, mirrors, lens) that directs the light to the image sensor. After the image sensor generates the electrical signals, an analog-to-digital converter converts the electrical signals to digital image data representing the scanned physical document. The scanner unit 315 then outputs the digital image data to one or more other components of the image processing device 300 via the device interface 314.

The printer unit 316 is an image output device for printing on a sheet an image corresponding to image data. In response to a print command received at the image processing device 300, the printer unit 316 receives image data via the device interface 314 and outputs to a sheet an image corresponding to the image data.

Figure 4:
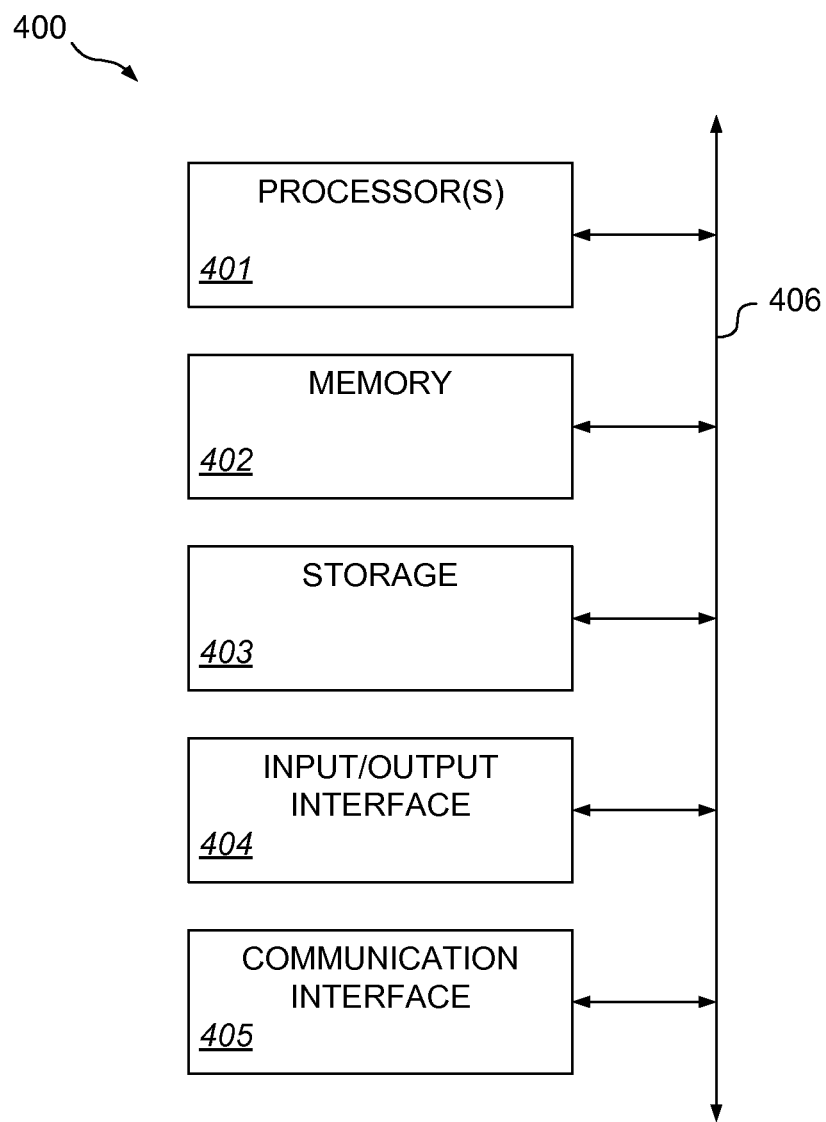
FIG. 4 illustrates an example computing system.

FIG. 4 illustrates an example computing system 400. According to various embodiments, all or a portion of the description of the computing system 400 is applicable to all or a portion of one or more of the image processing device 101, the one or more printer(s) 104, the one or more fax machine(s) 105, and the one or more server(s) 106.

The term computing system as used herein includes but is not limited to one or more software modules, one or more hardware modules, one or more firmware modules, or combinations thereof, that work together to perform operations on electronic data. The physical layout of the modules may vary. A computing system may include multiple computing devices coupled via a network. A computing system may include a single computing device where internal modules (such as a memory and processor) work together to perform operations on electronic data. Also, the term resource as used herein includes but is not limited to an object that can be processed at a computing system. A resource can be a portion of executable instructions or data.

In some embodiments, the computing system 400 performs one or more steps of one or more methods described or illustrated herein. In some embodiments, the computing system 400 provides functionality described or illustrated herein. In some embodiments, software running on the computing system 400 performs one or more steps of one or more methods described or illustrated herein or provides functionality described or illustrated herein. Some embodiments include one or more portions of the computing system 400.

The computing system 400 includes one or more processor(s) 401, memory 402, storage 403, an input/output (I/O) interface 404, a communication interface 405, and a bus 406. The computing system 400 may take any suitable physical form. For example, and not by way of limitation, the computing system 400 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, PDA, a server, a tablet computer system, or a combination of two or more of these.

The processor(s) 401 include hardware for executing instructions, such as those making up a computer program. The processor(s) 401 may retrieve the instructions from the memory 402, the storage 403, an internal register, or an internal cache. The processor(s) 401 then decode and execute the instructions. Then, the processor(s) 401 write one or more results to the memory 402, the storage 403, the internal register, or the internal cache. The processor(s) 401 may provide the processing capability to execute the operating system, programs, user and application interfaces, and any other functions of the computing system 400.

The processor(s) 401 may include a central processing unit (CPU), one or more general-purpose microprocessor(s), application-specific microprocessor(s), and/or special purpose microprocessor(s), or some combination of such processing components. The processor(s) 401 may include one or more graphics processors, video processors, audio processors and/or related chip sets.

In some embodiments, the memory 402 includes main memory for storing instructions for the processor(s) 401 to execute or data for the processor(s) 401 to operate on. By way of example, the computing system 400 may load instructions from the storage 403 or another source to the memory 402. During or after execution of the instructions, the processor(s) 401 may write one or more results (which may be intermediate or final results) to the memory 402. One or more memory buses (which may each include an address bus and a data bus) may couple the processor(s) 401 to the memory 402. One or more memory management units (MMUs) may reside between the processor(s) 401 and the memory 402 and facilitate accesses to the memory 402 requested by the processor(s) 401. The memory 402 may include one or more memories. The memory 402 may be random access memory (RAM).

The storage 403 stores data and/or instructions. As an example and not by way of limitation, the storage 403 may include a hard disk drive, a floppy disk drive, flash memory, an optical disc, a magneto-optical disc, magnetic tape, or a Universal Serial Bus (USB) drive or a combination of two or more of these. In some embodiments, the storage 403 is a removable medium. In some embodiments, the storage 403 is a fixed medium. In some embodiments, the storage 403 is internal to the computing system 400. In some embodiments, the storage 403 is external to the computing system 400. In some embodiments, the storage 403 is non-volatile, solid-state memory. In some embodiments, the storage 403 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. The storage 403 may include one or more memory devices. One or more program modules stored in the storage 403 may be configured to cause various operations and processes described herein to be executed.

The I/O interface 404 includes hardware, software, or both providing one or more interfaces for communication between the computing system 400 and one or more I/O devices. The computing system 400 may include one or more of these I/O devices, where appropriate. One or more of these I/O devices may enable communication between a person and the computing system 400. As an example and not by way of limitation, an I/O device may include a keyboard, keypad, microphone, monitor, mouse, speaker, still camera, stylus, tablet, touch screen, trackball, video camera, another suitable I/O device or a combination of two or more of these. An I/O device may include one or more sensors. In some embodiments, the I/O interface 404 includes one or more device or software drivers enabling the processor(s) 401 to drive one or more of these I/O devices. The I/O interface 404 may include one or more I/O interfaces.

The communication interface 405 includes hardware, software, or both providing one or more interfaces for communication (such as, for example, packet-based communication) between the computing system 400 and one or more other computing systems or one or more networks. As an example and not by way of limitation, the communication interface 405 may include a network interface card (NIC) or a network controller for communicating with an Ethernet or other wire-based network or a wireless NIC (WNIC) or wireless adapter for communicating with a wireless network, such as a WI-FI network. This disclosure contemplates any suitable network and any suitable communication interface 405 for it. As an example and not by way of limitation, the computing system 400 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, the computing system 400 may communicate with a wireless PAN (WPAN) (such as, for example, a Bluetooth WPAN or an ultra wideband (UWB) network), a WI-FI network, a WI-MAX network, a cellular telephone network (such as, for example, a Global System for Mobile Communications (GSM) network), or other suitable wireless network or a combination of two or more of these. The computing system 400 may include any suitable communication interface 405 for any of these networks, where appropriate. The communication interface 405 may include one or more communication interfaces 405.

The bus 406 interconnects various components of the computing system 400 thereby enabling the transmission of data and execution of various processes. The bus 406 may include one or more types of bus structures including a memory bus or memory controller, a peripheral bus, and a local bus using any of a variety of bus architectures.

Various above-described operations performed by the image processing device 101 may be executed and/or controlled by one or more applications running on the image processing device 101. The above description serves to explain principles of the invention; but the invention should not be limited to the examples described above. For example, the order and/or timing of some of the various operations may vary from the examples given above without departing from the scope of the invention. Further by way of example, the type of network and/or computing systems may vary from the examples given above without departing from the scope of the invention. Other variations from the above-recited examples may also exist without departing from the scope of the invention.

The scope of the present invention includes a computer-readable medium storing instructions that, when executed by one or more processors, cause the one or more processors to perform one or more embodiments of the invention described herein. Examples of a computer-readable medium include a hard disk, a floppy disk, a magneto-optical disk (MO), a compact-disk read-only memory (CD-ROM), a compact disk recordable (CD-R), a CD-Rewritable (CD-RW), a digital versatile disk ROM (DVD-ROM), a DVD-RAM, a DVD-RW, a DVD+RW, magnetic tape, a nonvolatile memory card, and a ROM. Computer-executable instructions can also be supplied to the computer-readable storage medium by being downloaded via a network.

While the present invention has been described with reference to exemplary embodiments, it is to be understood that the invention is not limited to the disclosed exemplary embodiments.

What is claimed is:

1. A method comprising:
performing, at an image processing device, a login process wherein access to one or more resources on the image processing device is granted based on credential data associated with a user;
establishing a session between the user and the image processing device using the credential data;
receiving a request to perform a scan and send process at the image processing device, the request comprising instructions for executing a scan task for scanning a physical document and instructions for executing a send task for sending an electronic document representing the scanned physical document to a destination system, the scan task being executed during the session and the send task being automatically executed as a background process;
initiating the scan task to create job data including an electronic representation of the physical document;
generating a data object for processing during the send task, the data object including the job data and the credential data linked together within the data object;
storing the data object in a send queue to delay execution of the send task; and
simultaneously allowing a subsequent user to access the one or more resources of the image processing device by releasing the session while executing the send task as the background process using the credential data obtained from using the generated data object.

2. The method according to claim 1 further comprising:
receiving a second credential data associated with the user, the second credential data being different from the credential that granted the user access to the image processing device and specific for enabling access to the destination system; and
generating the data object to include the second credential data specific for enabling access to the destination system linked with the job data and the credential data within the generated data object.

3. The method according to claim 1, further comprising maintaining the data object in the data queue until a transmission initiation signal is received.

4. The method according to claim 3, further comprising:
prior to executing the send task for a first scan and send request, continually storing further data objects including job data and credential data linked with the further data objects and generated based on subsequent requests for scan and send processes.

5. The method according to claim 1, further comprising:
creating, during the scan task, the electronic document from the physical document, the created electronic document being in a first data format; and
wherein the job data included in the generated data object includes the electronic document in the first data format.

6. The method according to claim 5, further comprising determining a time for communicating the job data to the destination system;
converting the electronic document in the first data format into a second data format different from the first data format; and
automatically executing, at the determined time and as a background process, the send task to send the electronic document in the second data format to the destination system using the credential associated with the user that is stored within the data object and linked to the job data.

7. The method according to claim 1, further comprising determining a time for communicating the job data to the destination system; and
executing, as the background process after the session has been released, the send task at the determined time.

8. The method according to claim 7, wherein determining a time further includes:
monitoring at least one resource of the image processing device and at least one characteristic associated with the job data;
determining an impact parameter identifying the impact the send task for the job data would have on the image processing device based on the monitored at least one resource and at least one characteristic; and executing the send task, in the background processing, if the impact parameter is below a predetermined threshold impact value.

9. The method according to claim 8, further comprising monitoring at least one resource associated with one of a communications network and a destination system; and using the monitored resource in determining the impact parameter.

10. A non-transitory computer-readable medium storing instructions that, when executed by one or more processors, cause the one or more processors to perform operations comprising:

performing, at an image processing device, a login process wherein access to one or more resources on the image processing device is granted based on a credential data associated with a user;

establishing a session between the user and the image processing device using the credential data;

receiving a request to perform a scan and send process at the image processing device, the request comprising instructions for executing a scan task for scanning a physical document and instructions for executing a send task for sending an electronic document representing the scanned physical document to a destination system, the scan task being executed during the session and the send task being automatically executed as a background process;

initiating the scan task to create job data including an electronic representation of the physical document;

generating a data object for processing during the send task, the data object including the job data and the credential data linked together within the data object;

storing the data object in a send queue to delay execution of the send task; and simultaneously allowing a subsequent user to access the one or more resources of the image processing device by releasing the session while executing the send task as the background process using the credential data obtained from the generated data object.

11. A system comprising:
one or more processors; and
a memory coupled to the one or more processors, the memory storing instructions that, when executed by the one or more processors, cause the one or more processors to perform operations comprising:
performing, at an image processing device, a login process wherein access to one or more resources on the image processing device is granted based on credential data associated with a user;
establishing a session between the user and the image processing device using the credential data;
receiving a request to perform a scan and send process at the image processing device, the request comprising instructions for executing a scan task for scanning a physical document and instructions for executing a send task for sending an electronic document representing the scanned physical document to a destination system, the scan task being executed during the session and the send task being automatically executed as a background process;
initiating the scan task to create job data including an electronic representation of the physical document;
generating a data object for processing during the send task, the data object including the job data and the credential data linked together within the data object;
storing the data object in a send queue to delay execution of the send task; and
simultaneously allowing a subsequent user to access the one or more resources of the image processing device by releasing the session while executing the send task as the background process using the credential data obtained from the generated data object.

12. The system according to claim 11, wherein the operations further comprising
receiving a second credential data associated with the user, the second credential data being different from the credential that granted the user access to the image processing device and specific for enabling access to the destination system; and
generating the data object to include the second credential data specific for enabling access to the destination system linked with the job data and the credential data within the generated data object.

13. The system according to claim 11, wherein the operations further comprising
maintaining the data object in the data queue until a transmission initiation signal is received.

14. The system according to claim 13, wherein the operations further comprising
prior to executing the send task processing for a first scan and send request, continually storing further data objects including job data and credential data linked with the further data objects and generated based on subsequent requests for scan and send processes.

15. The system according to claim 11, wherein the operations further comprising
creating, during the scan task, the electronic document from the physical document, the created electronic document being in a first data format; and
wherein the job data included in the generated data object generated includes the electronic document in the first data format.

16. The system according to claim 15, wherein the operations further comprising
determining a time for communicating the job data to the destination system;
converting the electronic document in the first data format into a second data format different from the first data format; and
automatically executing, at the determined time and as a background process, the send process task to send of the electronic document in the second data format to the destination system using the credential associated with the user that is stored within the data object and linked to the job data.

17. The system according to claim 11, further comprising
determining a time for communicating the job data to the destination system; and
executing, as the background process after the session has been released, the send task at the determined time.

18. The system according to claim 17, wherein the operation of determining a time further includes
monitoring at least one resource of the image processing device and at least one characteristic associated with the job data;
determining an impact parameter identifying the impact the send process task for the job data would have on the image processing device based on the monitored at least one resource and at least one characteristic; and
executing the send process task, in the background processing, if the impact parameter is below a predetermined threshold impact value.

19. The system according to claim 18, wherein the operations further comprising
monitoring at least one resource associated with one of a communications network and a destination system; and
using the monitored resource in determining the impact parameter.

* * * * *